(12) United States Patent
Breton et al.

(10) Patent No.: US 11,679,889 B2
(45) Date of Patent: Jun. 20, 2023

(54) NACELLE OF AN AIRCRAFT PROPULSION ASSEMBLY COMPRISING A PLURALITY OF DAMPER ELEMENTS BETWEEN A FRONT SECTION AND A MAIN SECTION, AND ASSOCIATED AIRCRAFT PROPULSION ASSEMBLY

(71) Applicant: Airbus Operations S.A.S., Toulouse (FR)

(72) Inventors: Clément Breton, Saint-Jean (FR); Julien Sentier, Colomiers (FR); Frédéric Vinches, Larra (FR); Alain Porte, Colomiers (FR); Wolfgang Brochard, Carbonne (FR)

(73) Assignee: Airbus Operations S.A.S.

( * ) Notice: Subject to any disclaimer, the term of this patent is extended or adjusted under 35 U.S.C. 154(b) by 973 days.

(21) Appl. No.: 16/440,214

(22) Filed: Jun. 13, 2019

(65) Prior Publication Data

US 2020/0002016 A1    Jan. 2, 2020

(30) Foreign Application Priority Data

Jun. 28, 2018  (FR) ...................................... 18 55835

(51) Int. Cl.
| | | |
|---|---|---|
| *B64D 29/06* | (2006.01) | |
| *B64C 7/02* | (2006.01) | |
| *F01D 25/24* | (2006.01) | |

(52) U.S. Cl.
CPC ............... *B64D 29/06* (2013.01); *B64C 7/02* (2013.01); *F01D 25/243* (2013.01); *F05D 2260/30* (2013.01)

(58) Field of Classification Search
CPC .. B64D 29/06; B64D 29/00; B64D 2033/026; B64D 2033/0286; B64C 7/02; F02C 7/04
See application file for complete search history.

(56) References Cited

U.S. PATENT DOCUMENTS

| | | | | |
|---|---|---|---|---|
| 4,741,542 A | * | 5/1988 | Kimerly | ................ B29C 70/745 |
| | | | | 29/525.04 |
| 5,941,061 A | * | 8/1999 | Sherry | ................... B64D 29/08 |
| | | | | 244/54 |
| 7,891,671 B2 | * | 2/2011 | Allford | .................. F16J 15/062 |
| | | | | 277/645 |
| 2010/0000227 A1 | | 1/2010 | Porte et al. | |
| 2015/0007896 A1 | * | 1/2015 | Joret | ........................ F02C 7/20 |
| | | | | 137/15.1 |

FOREIGN PATENT DOCUMENTS

| | | |
|---|---|---|
| EP | 2256302 A1 | 12/2010 |
| FR | 2973467 A1 | 10/2012 |
| FR | 3055885 A1 | 3/2018 |
| WO | 2008006959 A1 | 1/2008 |

* cited by examiner

*Primary Examiner* — Eldon T Brockman
*Assistant Examiner* — Maxime M Adjagbe
(74) *Attorney, Agent, or Firm* — Lerner David LLP

(57) ABSTRACT

A nacelle of an aircraft propulsion assembly includes a front section and a main section. The nacelle also includes a junction flange between the front section and the main section including a plurality of deformable damper elements distributed along the inner peripheral edge of a stiffening frame of the nacelle. The damper element allows significant stresses to be absorbed between the engine flange and the stiffening frame. This configuration is particularly adapted to large nacelles. An aircraft propulsion assembly including such a nacelle is also described.

15 Claims, 8 Drawing Sheets

NACELLE OF AN AIRCRAFT PROPULSION ASSEMBLY COMPRISING A PLURALITY OF DAMPER ELEMENTS BETWEEN A FRONT SECTION AND A MAIN SECTION, AND ASSOCIATED AIRCRAFT PROPULSION ASSEMBLY

FIELD OF THE INVENTION

The present invention relates to the nacelles of aircraft propulsion assemblies. The present invention also relates to an aircraft propulsion assembly comprising a nacelle.

An aircraft propulsion assembly is a device for generating thrust. This thrust forms the motive power of the aircraft equipped with the propulsion assembly.

In general, the present invention relates to the connection parts used to connect various constituent parts of the nacelles of aircraft propulsion assemblies, which are subject to significant mechanical stresses.

BACKGROUND OF THE INVENTION

Conventionally, a nacelle comprises two sections: a front section and a main section. Such a structure is shown in FIG. 1.

More specifically, the nacelle comprises a front section P1 forming the air intake 21 and in which the fan of the propulsion assembly is generally arranged. The nacelle also comprises a main section P2 forming the remainder of the nacelle. The engine of the propulsion assembly, for example, a turbojet engine, is contained in the main section P2.

Throughout the present document, the notions of "front" and of "rear" are understood in the direction of the air flow in the propulsion assembly. For example, air enters through the front of the propulsion assembly, i.e. through the front section P1 of the nacelle. The air passes through the propulsion assembly. The air then exits through the rear of the propulsion assembly, i.e. through the rear end of the main section P2, or even the air exhaust 22 of the propulsion assembly.

A conventional structure for the front section P1, as known from the prior art, is more specifically described with reference to FIG. 2.

The front section P1 comprises a lip 1 forming the air intake 21. The lip 1 is connected to a frame, called front frame 2.

The front section P1 generally comprises a panel, called acoustic panel 3. The acoustic panel 3 forms an inner structure of the front section P1, for which it can form an inner surface 31. The acoustic panel 3 allows the noise that is particularly generated by the vanes of the fan of the propulsion unit to be attenuated.

In a front section of the nacelle P1 according to the prior art, as shown in FIG. 2, a frame, called stiffening frame 5, connects the acoustic panel 3 to the outer panel 4.

The stiffening frame 5 is generally positioned at the rear end of the front section P1.

Conventionally, as shown in FIG. 3, which illustrates a known configuration of a connection between the front section P1 and the main section P2 of a nacelle, the front section P1 is connected to the main section P2 by a junction flange 6.

More specifically, the junction flange 6 is connected, on the one hand, to the acoustic panel 3 of the front section P1 and, on the other hand, to an engine flange 7 of the main section P2 that is rigidly connected to the engine of the propulsion assembly. These connections are conventionally made by screw and nut systems.

However, even though the conventionally used parts have a very high reliability level, in particular with respect to their fatigue strength, the mechanical connections that they form can be optimized in order to be able to withstand very high mechanical stresses in the vicinity of the junction flange 6.

More specifically, events that can occur during the various flight phases of an aircraft are likely to damage the propulsion assemblies. Such an event particularly can be an impact with external objects, such as birds. Another envisaged event can be a sudden breakage of a vane of the fan of the propulsion unit, or "FBO" (Fan Blade Out). The result of this event is a violent impact inside the nacelle, creating an imbalance that generates a significant disequilibrium in the stresses inside the propulsion assembly.

Thus, a significant stress can occur in the vicinity of the connection between the front section P1 and the main section P2. This connection must withstand the aforementioned events as much as possible.

BRIEF SUMMARY OF THE INVENTION

Aspects of the present invention may optimize the configuration of the connection between the front section P1 and the main section P2 of a nacelle of an aircraft propulsion assembly in order to allow it to withstand greater mechanical stresses than the known connections of the prior art.

Thus, an embodiment of the invention is a nacelle of an aircraft propulsion assembly, comprising a front section and a main section, said front section having a front end forming an air intake in the nacelle and a rear end comprising an annular stiffening frame around a rotary axis, said stiffening frame comprising an outer peripheral edge, connected to an outer panel of the nacelle, and an inner peripheral edge. The front section comprises a connection part connecting said inner peripheral edge of the stiffening frame to an inner structure of the nacelle and a junction flange connected, on the one hand, to said inner peripheral edge of the stiffening frame and, on the other hand, to an engine flange of the main section. The junction flange comprises, in an embodiment of the invention, a plurality of deformable damper elements distributed along the inner peripheral edge of the stiffening frame.

The presence of deformable damper elements in the vicinity of the junction flange allows greater mechanical stresses to be absorbed than a conventional connection as known from the prior art.

In one embodiment, at least one of the connections between the junction flange and the stiffening frame, on the one hand, and between the junction flange and the engine flange, on the other hand, comprises a spacer adapted to deform under the effect of mechanical stresses between said engine flange and said stiffening frame.

Each damper element advantageously can be formed by a bridge of material having a hollow closed section. For example, each damper element can have a substantially oval, for example, elliptical, or circular shaped section.

In one embodiment, at least one damper element can comprise a hollow closed section forming a cavity, into which an elastomer element is inserted.

The elastomer element can comprise at least one recess of material.

The elastomer element can extend between at least two surfaces of the damper element.

In a particular embodiment, the elastomer element extends between two opposite surfaces of the damper element.

In a particular embodiment, the damper element comprises a bridge of material and an elastomer element. The bridge of material comprises a hollow open section and the elastomer element lines the inner walls of the damper element.

In another embodiment, the damper element comprises an armature and an elastomer element. The armature comprises a substantially S-shaped section. The armature is fully or partly included in the elastomer element. In a particular embodiment, each damper element has a section of substantially oval, for example, elliptical, or circular shape.

The nacelle can comprise common connections between the stiffening frame, the connection part and the damper elements of the junction flange.

The connections between the stiffening frame and the junction flange, on the one hand, and between the junction flange and the engine flange, on the other hand, can each comprise at least one screw and nut assembly. Furthermore, each damper element of the junction flange can comprise a first side and a second side, that respectively comprise supports adapted to receive and retain the nuts of said screw and nut assemblies.

In a particular embodiment, the junction flange can comprise a sealing flange formed by a ring having a substantially U-shaped section. One branch of the "U" is then connected to said stiffening frame and the other branch of the "U" is connected to the engine flange. The sealing flange, the damper element and the stiffening frame, on the one hand, and the sealing flange, the damper element and the engine flange, on the other hand, can be connected together by common connections, such as screw and nut systems.

The connections between the stiffening frame and the junction flange, on the one hand, and between the junction flange and the engine flange, on the other hand, are circumferentially offset from each other so as not to be facing each other.

The invention also relates to an aircraft propulsion assembly comprising a nacelle as described above.

Further features and advantages of the invention will become more apparent from the following description.

BRIEF DESCRIPTION OF THE DRAWINGS

In the accompanying drawings, which are provided by way of non-limiting examples.

DETAILED DESCRIPTION

Figure 1:
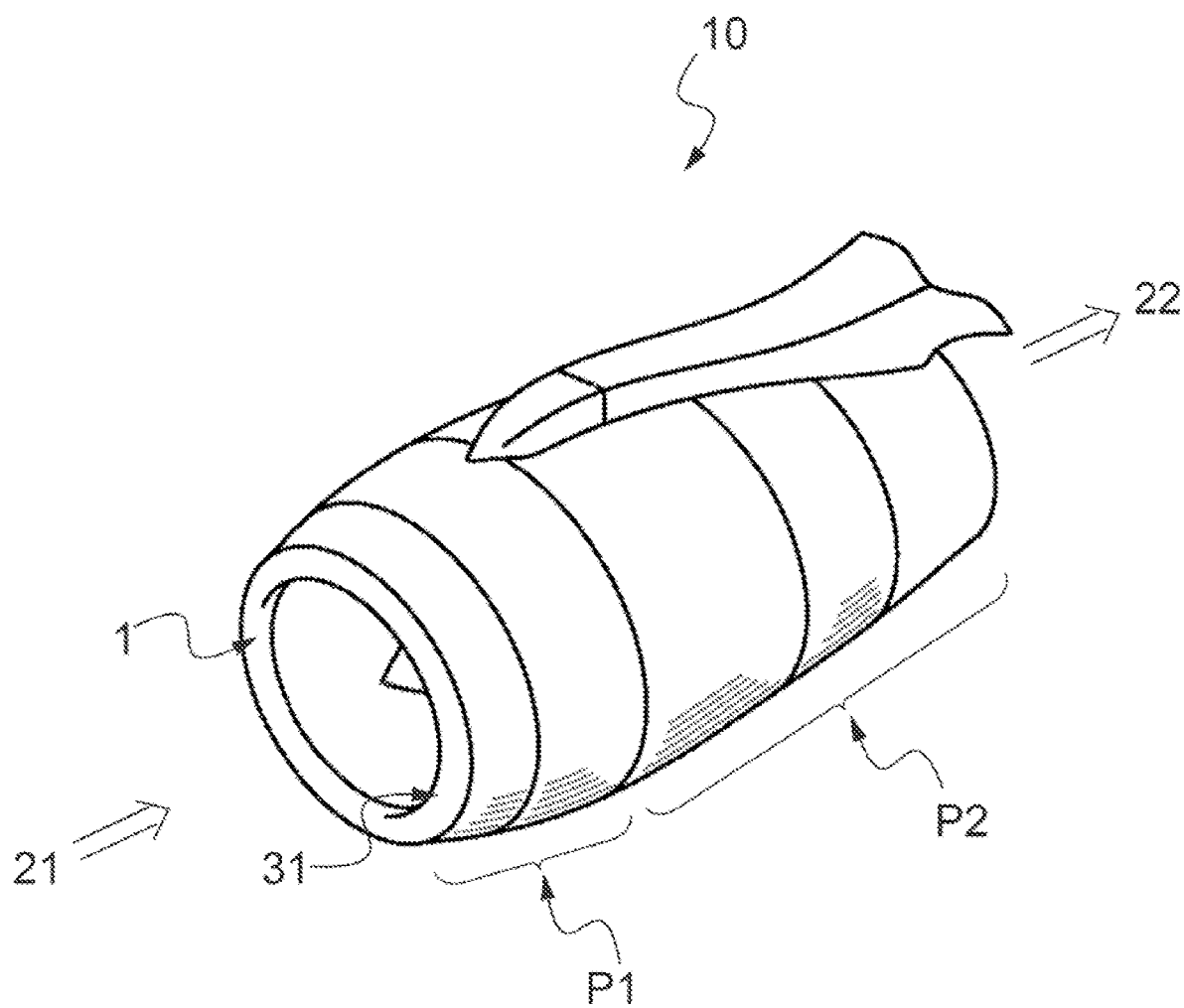
FIG. 1 shows a nacelle according to the prior art as a three-dimensional schematic view.
Figure 2:
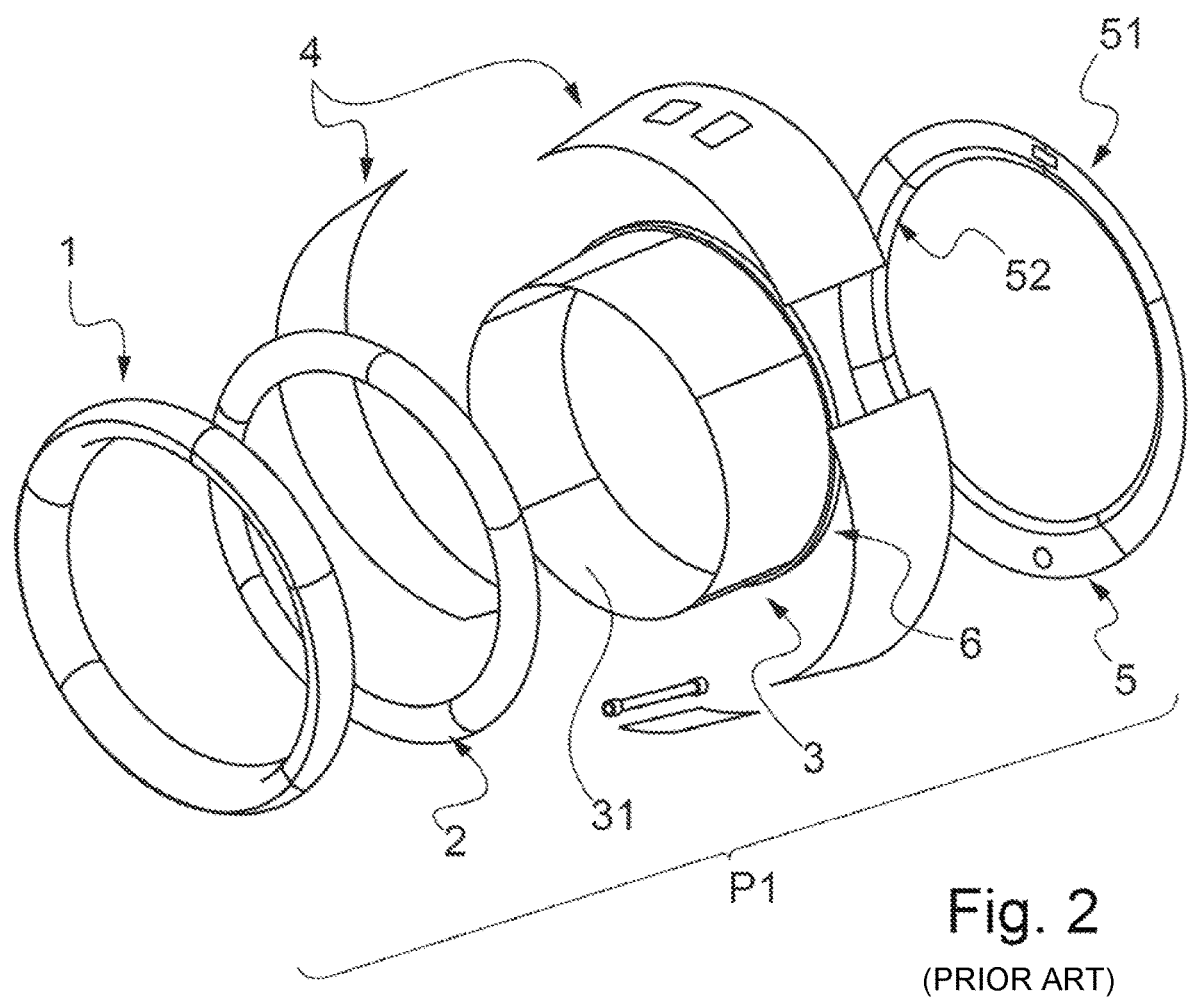
FIG. 2 shows an exploded three-dimensional schematic view of the main constituent elements of the front section of a nacelle according to the prior art.
Figure 3:
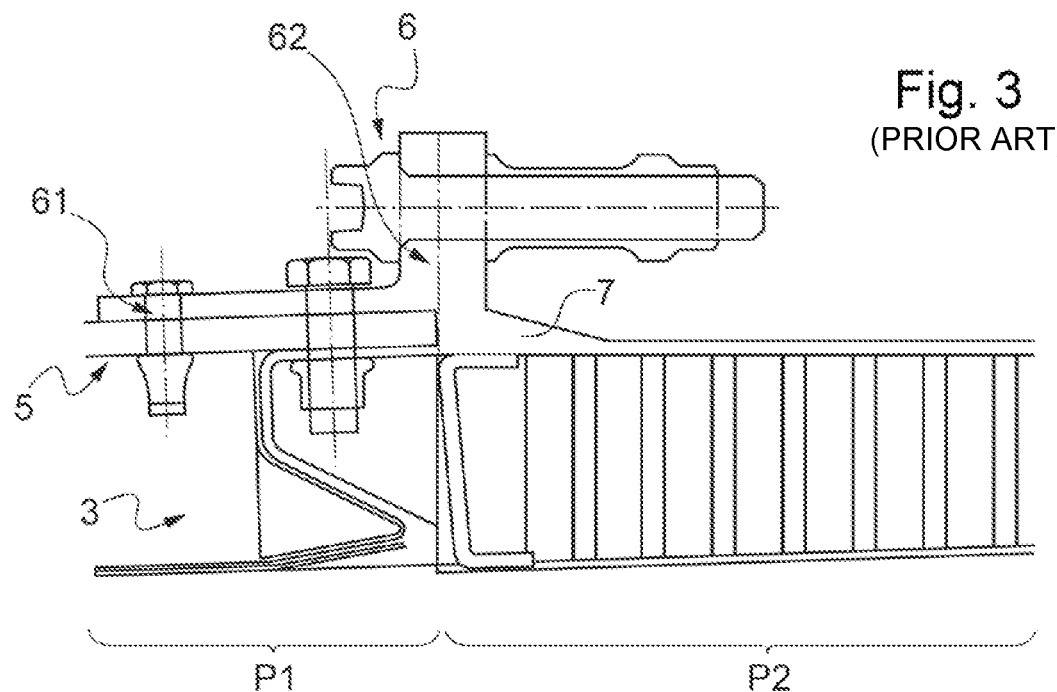
FIG. 3 shows a schematic section view of the connection between the acoustic panel and the engine flange of a nacelle according to the prior art.

FIGS. 1 to 3 have been generally described above with reference to the prior art preceding the invention.

In order to properly understand aspects of the invention, with reference to FIGS. 1 to 3, the elements will also be noted that are described hereafter regarding the front section P1, the main section P2 and the stiffening frame 5 of the front section P1.

The front section P1 is the section through which the air flow 21 enters the nacelle 10. The front section P1 comprises an intake lip 1 that is visible from outside and forms the edges of the intake of the nacelle 10. The main section P2 is connected in the extension of the front section P1.

The main section P2 mainly comprises the engine elements of a propulsion assembly. The rear end of the main section P2 comprises the air exhaust 22. Typically, the front section P1 comprises, from the front to the rear of the nacelle 10, a lip 1, a front frame 2, an acoustic panel 3 surrounded by outer panels 4 and a stiffening frame 5.

The stiffening frame 5 connects the outer panel 4 to the acoustic panel 3.

The stiffening frame 5 is arranged at a rear end of the front section P1.

An example of a connection implemented in the prior art between the front section P1 and the main section P2 of a nacelle of an aircraft propulsion assembly is shown in FIG. 3. This figure particularly shows a known configuration of the connection of the front section P1 (in the vicinity of the stiffening frame 5 and of the acoustic panel 3 of said front section P1) and an engine flange 7 of the main section P2.

Thus, the stiffening frame 5 is connected to the engine flange 7 by means of a junction flange 6.

More specifically, the junction flange 6 is a part that is formed, in this example, by a ring having an L-shaped section. The junction flange 6 comprises two branches 61, 62, on which perforations are arranged that are able to receive connection means. A first branch 61 is connected both to the stiffening frame 5 and to the acoustic panel 3 by bolting using screw and nut systems or by rivets. A second branch 62 is only connected to the engine flange 7 by a screw and nut system.

However, this type of connection is stiff and can be improved for the purpose of absorbing very high stresses exerted in the vicinity of the engine flange 7.

Furthermore, the type of connection used in the prior art and described above is not optimal for the nacelle 10 of a propulsion assembly with a very high bypass ratio. This type of propulsion assembly exhibits good energy yield, which allows the fuel consumption to be reduced. However, the mechanical stresses are potentially greater in this type of engine than in conventional engines. Furthermore, this type of engine has a large nacelle 10, with a dense aerodynamic profile and with a length that is shorter than the lengths of conventional propulsion units. However, the connections described with reference to FIGS. 1 to 3 are ill suited for such a configuration of a nacelle 10. Indeed, the connections described above are not suitable for connecting a front section P1 to a main section P2 when the engine flange 7 is located at a level of that of the inner structure (for example, the acoustic panel) of the front section P1. Thus, a different structure for the connection between the front section P1 and the main section P2 can be necessary for this type of engine.

Figure 4:
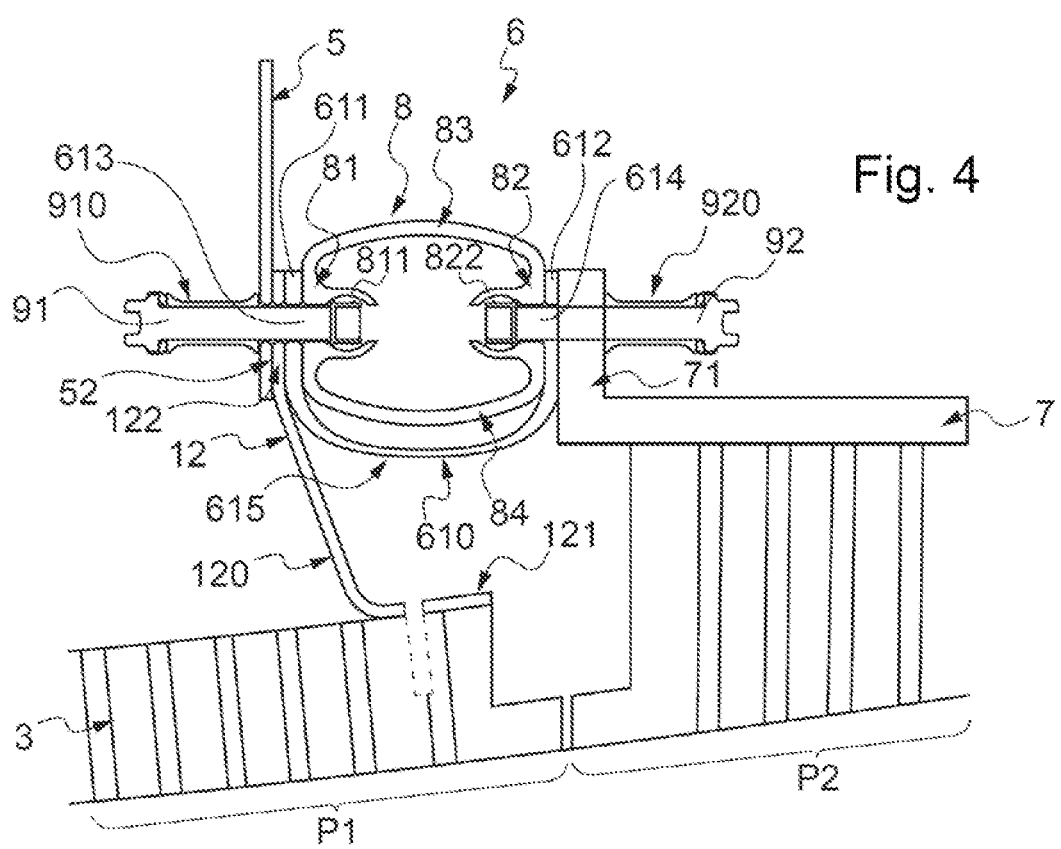
FIG. 4 shows a schematic section view of the connection between the acoustic panel and the engine flange of a nacelle according to one embodiment of the invention.

FIG. 4 shows a schematic section view of the connection, according to one embodiment of the invention, between the front section P1 and the main section P2 of a nacelle 10. The configuration shown in FIG. 4 particularly, but in a non-limiting manner, corresponds to a nacelle connection of a high bypass ratio engine. Indeed, as previously mentioned, in this type of engine the nacelle 10 is large.

According to an embodiment of the invention, and as is particularly shown in FIG. 4, the stiffening frame 5 is connected to the engine flange 7 by means of a junction flange 6 comprising a plurality of damper elements 8. FIG. 4 is a section view of the connection between a front section P1 and a rear section P2 of a nacelle according to one embodiment of the invention, so that a single damper element 8 is shown thereon. As will be described hereafter, in particular with reference to FIG. 5, an aspect of the invention nevertheless proposes a junction flange 6 comprising a plurality of damper elements circumferentially distributed in the junction flange 6, i.e. distributed along the inner peripheral edge 52 of the stiffening frame 5.

In the embodiment shown, the connection flange 6 also comprises an optional sealing flange 610.

The purpose of the sealing flange 610 is to provide the seal in the vicinity of the junction made by the junction flange 6. The sealing flange 610 has the particular function of providing the seal for the junction flange 6. It is not, or is hardly, used in the dissipation of the mechanical stresses in the vicinity of this junction.

In this case, the sealing flange 610 is a part with a substantially U-shaped section, the opening of which is oriented towards the outside of the nacelle 10.

In an alternative embodiment, the opening of the "U" section can be oriented towards the inside of the nacelle 10.

The sealing flange 610 can be formed as a one-piece ring or formed by a plurality of segments in an arc of a circle in abutment against one another (for example, spliced).

The sealing flange 610 can assume any other shape or constitution guaranteeing the desired sealing level. The seal also can be made, in an embodiment that is not shown, by interposing a seal (for example, made of elastomer and/or a rigid ring) on either side of the junction flange 6, and in particular on either side of the damper element 8.

In the embodiment shown in FIG. 4, the damper element 8 is housed in the sealing flange 610.

The damper element 8 provides the mechanical connection between the stiffening frame 5 and the engine flange 7.

Due to the configuration of the nacelle, the stiffening frame 5 has an inner peripheral edge 52 at a distance from the inner structure of the nacelle (namely the acoustic panel 3). A connection part 12 is thus provided that connects the inner peripheral edge 52 of the stiffening frame 5 to said acoustic panel 3.

The connection part 12 in this case is a substantially rotary part comprising, in the example shown, three portions. A main portion 120 extends between the damper element 8 and the acoustic panel 3. A portion 121 is in contact with the acoustic panel 3 and a portion 122 is in contact, on a first face, with the stiffening frame 5 and, on a face opposite the first face, with the junction flange 6. Other configurations of the connection part 12 can be contemplated: for example, an L-shape (according to the two possible configurations), or having more than three portions, or a Y-shape (with the two symmetrical branches of the Y being connected to the acoustic panel), etc.

In order to enable the connections to be made by elements (screws, pins or rivets, for example) passing through the various parts that are joined together, matching perforations can be produced in said parts.

For example, the first branch 121 of the connection part 12 comprises a perforation that is facing a perforation produced in an inner structure of the front section P1, for example, in the acoustic panel 3. The second branch 122 of the connection part 12 also comprises a perforation facing a perforation of the junction flange 6, in particular a perforation of the damper element 8. Where appropriate, a matching perforation can be provided on a branch 611 of the sealing flange 610. Each perforation is adapted to receive a connection element, such as a screw and nut system, for fastening the stiffening frame 5.

Thus, the sealing flange 610 can assume a shape that is able, on the one hand, to house the damper elements 8 and allows it to be fastened both to the stiffening frame 5 and to the engine flange 7.

In this case, the sealing flange 610 comprises at least two substantially parallel branches 611 and 612 extending substantially parallel both to a branch 52 of the stiffening frame 5 and to a branch 71 of the engine flange 7. In other words, the branches 611, 612 of the sealing flange 610, the branch 71 of the engine flange 7 and the second branch 52 of the stiffening frame 5 are substantially parallel pairwise.

The sealing flange 610 comprises, in each branch 611, 612, a perforation facing a perforation respectively produced in the thickness of a branch 52 of the stiffening frame 5 and in a branch 71 of the engine flange 7. The engine flange 7 in this case is a part having a substantially L-shaped section. Each perforation is adapted to receive a connection element, such as a screw and nut system 91, 92, for fastening the sealing flange 610 to the stiffening frame 5 and for fastening the sealing flange 610 to the engine flange 7.

This type of configuration implementing common connections allows assembling of the assembly to be simplified and the compactness of the device to be increased.

Figure 5:
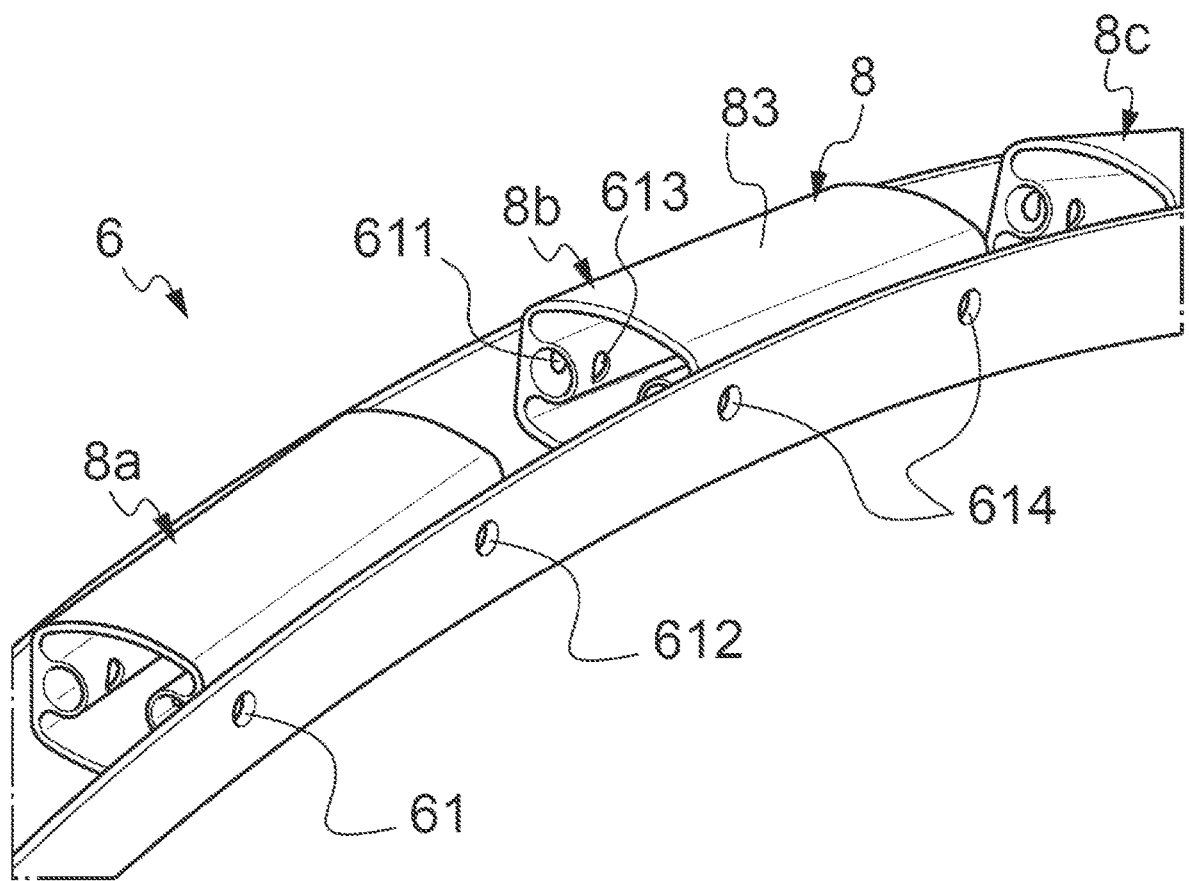
FIG. 5 shows a three-dimensional schematic view of a plurality of damper elements positioned in a junction flange, according to one embodiment of the invention.

In the embodiment shown in FIGS. 4 and 5, each damper element 8 is a deformable mechanical connection part.

The damper element 8 is able to deform in order to absorb a significant mechanical stress that is exerted between the engine flange 7 of the main section P2 and the structure of the front section P1 (i.e. the stiffening frame 5 and the connection part 12 rigidly connected to the acoustic panel 3).

Indeed, the presence of a damper element 8 thus allows energy to be absorbed, in particular when an event likely to damage the nacelle 10 occurs. With the junction flange 6 comprising a plurality of circumferentially distributed damper elements 8, an aspect of the invention allows the force to be absorbed locally during a localized impact.

The energy absorption function provided by the damper element 8 optionally can be supplemented by deformable spacers 910, 920. These spacers 910, 920 are positioned on at least one of the connections between the junction flange 6 and the stiffening frame 5, and between the junction flange 6 and the engine flange 7.

Thus, depending on the forces exerted between the main section P2 and the front section P1, these forces are absorbed either by the connections provided with spacers 910, 920, which results, where appropriate, in the deformation of these spacers, or by the damper element 8, or jointly by the connections provided with the spacers and by the damper element 8. A clearance can exist between the spacer and the connection on which it is installed. The length of a spacer (assuming that it is of a substantially rotationally cylindrical shape) typically can be approximately twice its diameter. The spacer can be metal, for example, made of steel. It can comprise a support collar at each of its ends.

Structurally, each damper element 8 comprises, in the embodiment shown herein, two sides 81, 82.

On the one hand, the first side 81 of the damper element 8 is in flat contact with the first branch 611 of the sealing flange 610. On the other hand, the second side 82 of the damper element 8 is in flat contact with the second branch 612 of the sealing flange 610.

The two sides 81, 82 of the damper element 8 comprise perforations in the thickness thereof opposite perforations 611, 612 in the sealing flange 610. These perforations are able to receive one or more screw and nut system(s) 91, 92 for fastening the damper element 8 to the sealing flange 610.

Advantageously, the first and second sides 81, 82 can be provided with supports 811, 822, adapted to receive and to retain a nut. Each support 811, 822 can have a flared shape adapted to retain nuts used in the connections formed by the screw and nut systems 91, 92 on either side of the damper element 8. This flared shape allows the nut to be received, which avoids having to hold it when assembling with the screw.

The nuts used in the screw and nut systems particularly can be blind nuts.

Thus, in the embodiment shown in FIG. 4, the branch 52 of the stiffening frame 5, the first branch 611 of the sealing flange 610, and the first side 81 of the damper element 8 are connected together by the same fastener. Similarly, the branch 71 of the engine flange 7, the second branch 612 of the sealing flange 610 and the second side 82 of the damper element 8 are fastened together by the same fastener.

The common fasteners allow the forces to be transmitted between the element connected to the junction flange 6 and the junction flange 6, in particular in the damper element. This type of assembling also has the advantage of reducing the number of fasteners to be produced. Thus, assembling is simplified and optimized.

The damper element 8 can be a hollow body able to deform under the effect of mechanical stresses. For example, with reference to FIG. 4, the damper element 8 is a tube obtained, for example, by extrusion or by folding, and, where appropriate, it is machined. Thus, if a significant mechanical stress is applied thereto, the damper element 8 can fold, deform, so as to absorb the energy, and optionally subsequently return to its original shape or to a shape close to its original shape (depending on the level of stresses experienced).

The damper element 8 can be a hollow body having a substantially oval, in particular elliptical, or circular section.

The damper element 8 can assume numerous other configurations. It can have various closed sections (for example, "peanut-shaped", i.e. bilobed, having concavity on one side or on two opposite sides) or open sections, for example, a U-shape (similar to the section of the sealing flange 610 shown in FIG. 4), or a W-shape. It can be formed by a deformable element having a cellular or perforated structure, in particular a "honeycomb" structure, or can be of the "isogrid" type (i.e. having stiffening ribs defining triangular hair cells, in particular as an isosceles triangle).

In one advantageous embodiment, the damper element 8 is a part with a substantially elliptical section. In the example shown herein, the damper element 8 with a substantially elliptical section comprises flattened peaks forming the first side 81 and the second side 82, said first and second sides being connected by two branches 83, 84 corresponding to ellipsis portions. The two branches 83, 84 are free from any contact and extend on either side of the substantially elliptical section. This particular shape allows the damper element 8 to absorb mechanical stresses.

The damper element 8 can be fully or partly formed by metal, a composite material or a hybrid composite/metal material. Thus, the weight of the damper element 8 is reduced while guaranteeing optimal mechanical properties, such as fatigue strength and deformation strength.

Figure 7A:
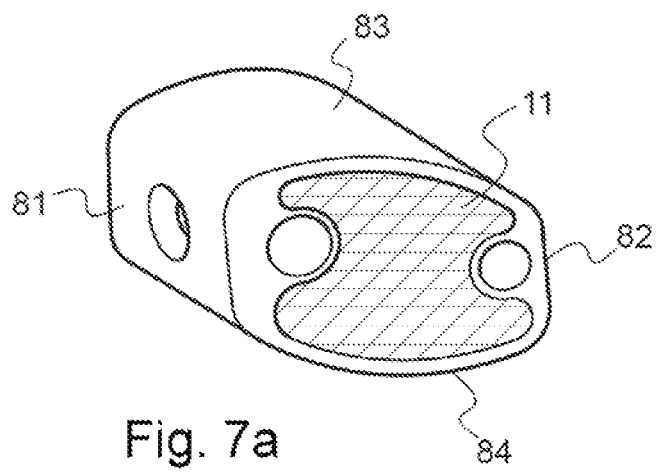
FIGS. 7a to 7c show, as a three-dimensional schematic view, three variants of a damper element with a hollow closed section, into which an elastomer element is inserted.
Figure 7B:
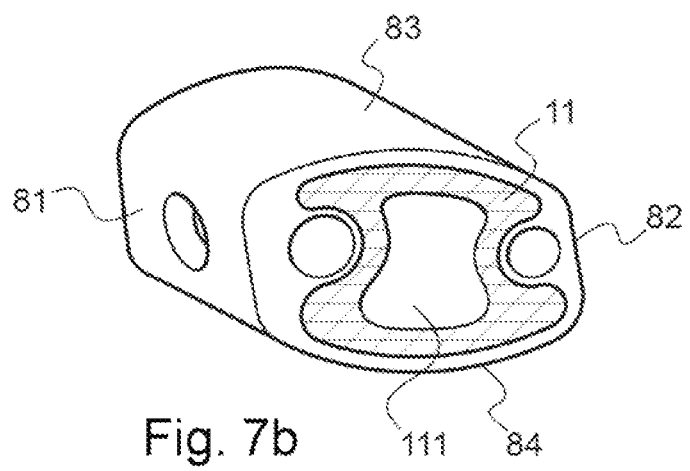
Figure 7C:
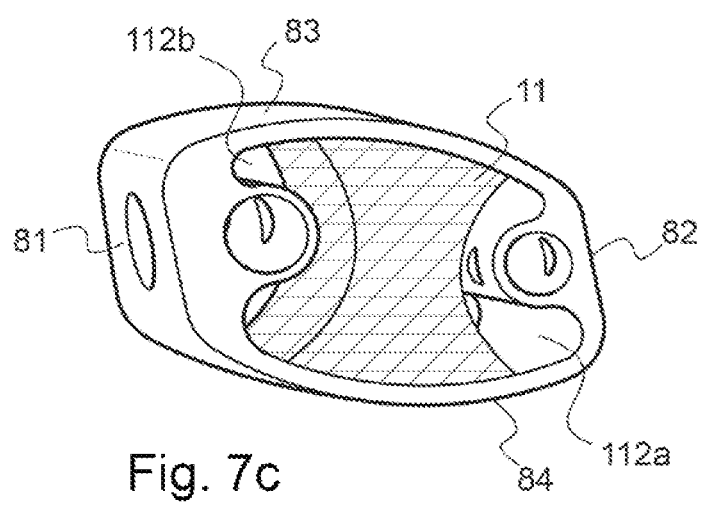

FIGS. 7a to 7c show another embodiment of the damper element 8. As in the embodiment shown in FIG. 4, the damper element 8 comprises a hollow body, i.e. a body for which the transverse section is hollow. The damper element can have a substantially oval or circular section, in particular an elliptical section. The damper element 8 forms at least one cavity.

In this embodiment, an elastomer is poured directly into the cavity of the damper element 8. The elastomer is thus directly crosslinked, preferably vulcanized, in said cavity, in order to form an elastomer element 11.

In a particular embodiment, the elastomer element 11 can comprise a recess of material formed during the vulcanization. The recess can assume any shape.

In an alternative embodiment, the elastomer element 11 can be a solid, machined or non-machined, block introduced into the cavity of the damper element 8. When the elastomer element 11 is machined, the shape of the cavity can be assumed by the elastomer. Thus, the elastomer element 11 fully or partly matches the shape of the cavity.

In other words, in this case the elastomer element 11 can be in contact with only a few surfaces defining the walls of the cavity of the damper element 8.

In a first variant shown in FIG. 7a, the elastomer element 11 completely fills the cavity of the damper element 8. The elastomer lines the walls of the cavity of the damper element 8 and no recess is present in the core of the elastomer element 11.

In a non-limiting manner, the elastomer element 11 can be formed by a natural elastomer (for example, a rubber), a synthetic elastomer (for example, a silicone), or even a nitrile based elastomer. The elastomer can be vulcanized, for example, using sulfur.

Depending on the stresses to be dissipated and in order to optimize the mass, it is possible for recesses to be added into the elastomer element 11. Thus, as shown in FIG. 7b, in a second variant, at least one recess 111 has been arranged in the thickness of the elastomer 11. This recess 111 can assume any shape.

In a particular embodiment, the recess 111 follows the contours of the inner wall of the damper element 8.

In other words, the elastomer element 11 lines the inner wall of the damper element 8. In particular, the elastomer element 11 can form an even added thickness on the inner wall of the damper element 8. The elastomer element 11 is in contact with the inner wall of the damper element 8.

Of course, the elastomer element 11 can comprise a plurality of recesses and the arrangement of the recess 111 (or of the recesses) is not limited to that which is described with reference to FIG. 7b.

In a third variant shown in FIG. 7c, the elastomer element 11 extends between the branches 83, 84 diametrically opposite the damper element 8.

More specifically, the elastomer element provides a junction of material between the inner walls of the branches 83, 84 opposite the damper element 8.

In this case, only part of the opposite inner walls is lined with elastomer 11.

In one embodiment, not shown, the walls are lined as a function of the zones of mechanical stresses experienced by the damper element 8. In other words, the distribution of the elastomer can be uneven in the cavity, in particular on the walls of the cavity and in the centre of the cavity. Junctions of elastomer material 11 could be produced as a function of the mechanical stresses.

In the embodiment shown herein in FIG. 7c, the other two inner walls of the opposite sides 81, 82 are not covered with elastomer 11.

The last two variants shown in FIGS. 7b and 7c described above have alternatives for limiting the increase in mass associated with adding elastomer to the damper element 8.

Figure 8A:
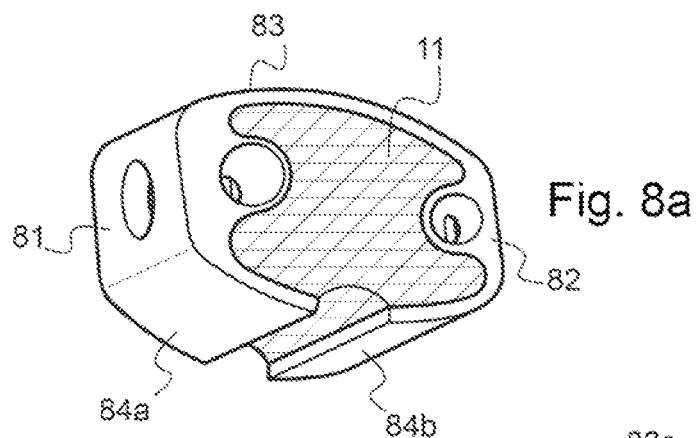
FIGS. 8a to 8c show, as a three-dimensional schematic view, three variants of a damper element with an open hollow section, into which an elastomer element is inserted.
Figure 8B:
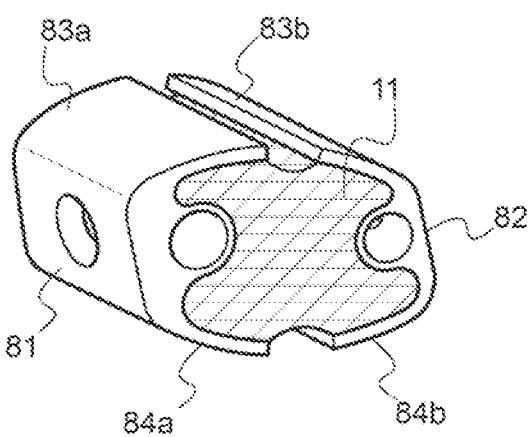
Figure 8C:
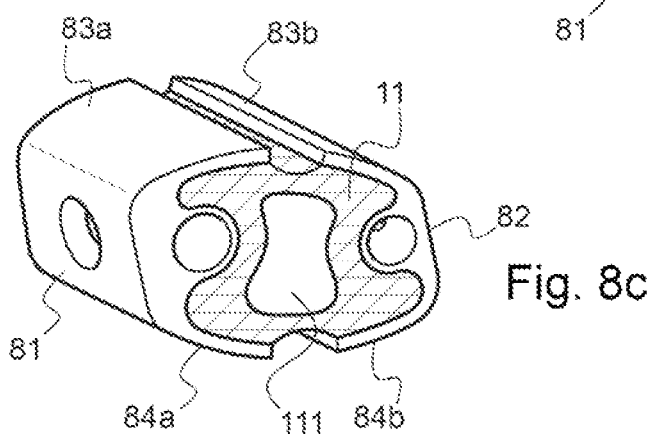

In an alternative embodiment shown in FIGS. 8a, 8b and 8c, as the elastomer element 11 withstands some of the mechanical stresses, the hollow body of the damper element 8 can comprise one or more opening(s) in combination with an elastomer element 11 completely or partly filling one of its cavities.

With reference to FIG. 8a, the damper element 8 comprises a first branch 83 connecting the first side 81 and the second side 82 of the damper element 8. The second branch 84 is not continuous. In other words, the second branch 84 comprises two arches 84a, 84b that do not join. An open hollow section is thus defined.

Thus, in this case, the elastomer element 11 filling the cavity of the damper element 8 withstands some of the stresses applied to the damper element 8 due to the discontinuity of the body of the damper element 8.

In one embodiment, the elastomer element 11 partially lines the inner surface of the damper element 8.

In an alternative embodiment, not shown, the second branch 84 can comprise notches or grooves when the mechanical stresses applied to the damper element 8 do not generate a permanent deformation of the damper element 8.

With reference to FIG. 8b, the two branches 83, 84 are respectively formed by two arches 83a, 83b, 84a and 84b.

More specifically, the damper element 8 in this case comprises two branches in two parts 83a, 83b, 84a, 84b arranged between a first side 81 and a second side 82. In other words, the two branches of the damper element 8 are in two parts 83a, 83b, 84a, 84b and do not join together.

The elastomer element 11 completely fills the cavity of the damper element 8. In other words, the elastomer element 11 completely lines the wall of the inner surface of the damper element 8 and no recess is present.

In a particular embodiment, the elastomer element 11 partially lines the inner surface of the damper element 8. In other words, recesses in contact with the inner surface of the damper element 8 are present in the cavity of the damper element 8.

With reference to FIG. 8c, the damper element 8 also comprises two branches in two parts 83a, 83b, 84a, 84b arranged between a first side 81 and a second side 82. In other words, the two branches in two parts 83a, 83b, 84a, 84b do not join together.

In this embodiment, the elastomer element 11 comprises at least one recess 111. Each recess 111 can assume any shape.

The presence of at least one recess 111 allows a less rigid and lighter connection to be obtained.

Thus, in the last two variants 8b, 8c of the embodiment that has just been described, the damper element 8 is a "pure damper". In other words, the stresses are fully transmitted by the elastomer element 11. The damper element 8 in this case only allows vibration energy to be dissipated. Furthermore, the mechanical connection is wholly provided by the elastomer element 11.

Indeed, in the last two variants, the two branches are in two parts 83a, 83b, 84a, 84b. Thus, none of the branches produces a bridge of material, that is a mechanical connection, when the damper element 8 is mounted between the front section P1 and the main section P2 of a nacelle 10.

Figure 9:
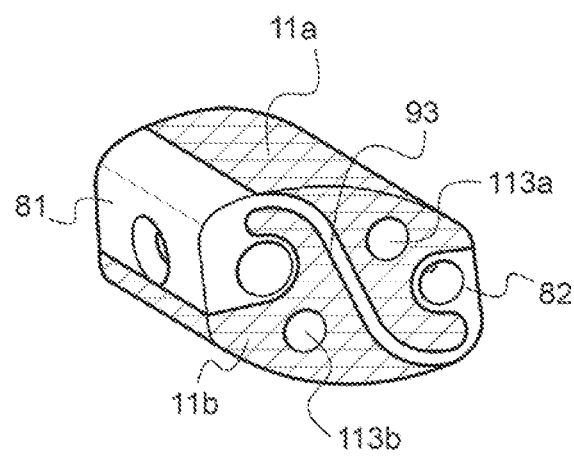
FIG. 9 shows, as a three-dimensional schematic view, another variant of a damper element.

In an alternative embodiment shown in FIG. 9, the damper element 8 comprises an armature 81, 93, 82 and at least one elastomer element 11.

The armature 81, 93, 82 comprises only two sides 81, 82 and one connection branch 93. The two sides 81, 82 can comprise recesses in the thickness thereof to allow, for example, the fastening of the damper element 8. In other words, the two sides 81, 82 can comprise perforations allowing the insertion of conventional mechanical fastening means, such as a screw and nut system. These sides 81, 82 are connected together by a continuous connection branch 93. In this case, the connection branch 93 comprises two curvature radii.

In other words, in this case the section of the armature 81, 93, 82 is substantially S-shaped. More specifically, the armature 81, 93, 82 is formed by a strip angled in the same direction but in the opposite way at its two opposite ends. The angles are substantially 80° relative to the largest plane of the strip of material.

In other words, the strip forms two diametrically opposite elbows having substantially the same direction and being in the opposite way.

The specific shape of the armature 81, 93, 82 allows the absorption of the mechanical stresses and the dissipation of the vibration energy to be optimized.

In this case, the armature 81, 93, 82 is reinforced by the arrangement of an elastomer element formed by two elastomer blocks 11a, 11b. Each elastomer block 11a, 11b can be solid or can comprise one or more recess(es) 113a, 113b for minimizing the additional mass. The two elastomer blocks 11a, 11b are connected to the armature 81, 93, 82.

More specifically, an elastomer block 11a comprising a recess 113a with any type of section is arranged in contact with a side 82 and a first larger face of the connection branch 93. Another elastomer block 11b comprising a recess 113b is arranged in contact with a side 81 and the second face of the connection branch 93 opposite the first face. Thus, the blocks 11a, 11b allow the deformations of the armature 81, 93, 82 to be minimized, in particular the connection branch 93, when said branch experiences mechanical stresses.

According to a particular embodiment, the damper element 8 has a substantially oval, elliptical or circular section. In other words, the elastomer blocks 11a, 11b comprise at least one round face.

The junction flange 6 comprises a plurality of damper elements 8a, 8b, 8c. More specifically, the damper elements 8a, 8b, 8c can be circumferentially distributed (along the inner peripheral edge of the stiffening frame 5), for example, evenly spaced apart from each other, as shown in FIG. 5 or in FIGS. 10a to 10c.

It is possible, depending on the orientation of the stresses and/or on a potential dissymmetry of the nacelle 10, for at least two variants of damper elements 8 to be arranged that are evenly spaced apart from each other and are arranged on the periphery of the junction flange 610.

Figure 10A:
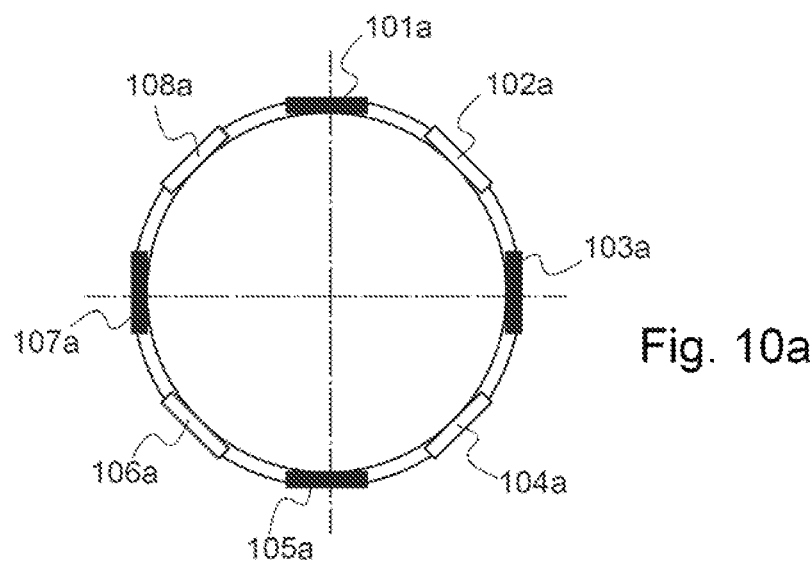
FIGS. 10a to 10c show, as a two-dimensional schematic diagram, examples of the distribution of damper elements on the periphery of a junction flange of a nacelle of an aircraft propulsion assembly.

As shown in FIG. 10a, two types of damper elements 8, denoted A and B, are arranged alternately.

In other words, each damper element 8 is followed and preceded by a different type of damper element 8. For example, a type A damper element 8 is followed by a type B damper element 8 and preceded by a type B damper element 8.

According to an alternative embodiment, the damper elements 8 can be arranged according to another sequence.

Figure 10B:
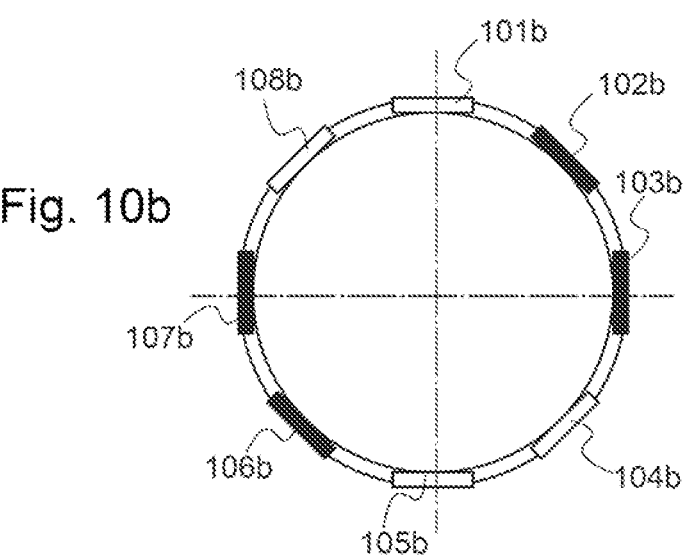
Figure 10C:
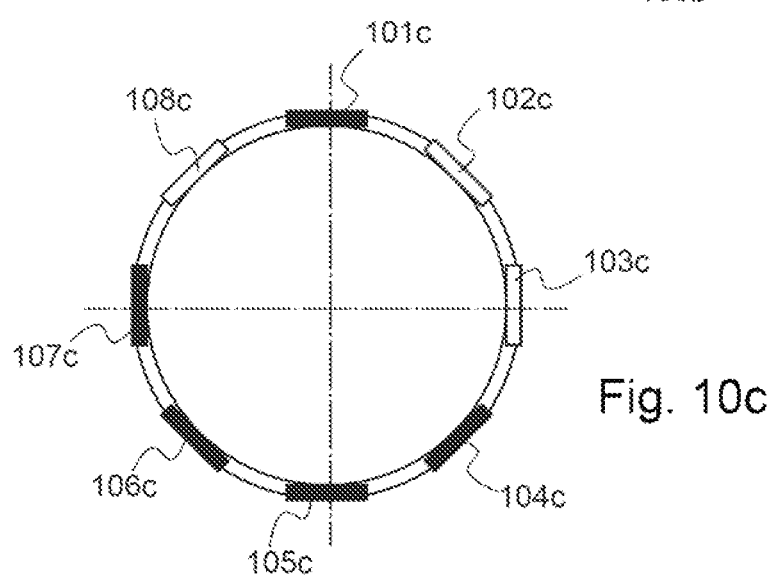

As shown in FIG. 10b, in this case a further eight damper elements 101b, 102b, 103b, 104b, 105b, 106b, 107b, 108b are shown. Of course, the number of damper elements could differ, for example, and in a by no means limiting manner, there could be six, ten, twelve, etc. elements.

As shown in FIG. 10a, two types of damper elements 8, denoted A and B, are arranged. A type A damper element 8 is arranged between a damper element 8 of the same type A and a different type of damper element 8, in this case a type B damper element. Thus, each damper element 8 is always respectively followed and preceded by at least one damper element 8 of the same type and one damper element 8 of a different type.

This particular arrangement can optimally address a potential dissymmetry of the nacelle 10 and/or a dissymmetry of the mechanical stresses and/or a dissymmetry of the mechanical loads by optimizing the absorption of the vibration energy.

In a final embodiment, in this case eight damper elements 101c, 102c, 103c, 104c, 105c, 106c, 107c, 108c are again shown. Again, in this case the number of damper elements is by no means limiting.

The damper elements are specifically distributed. In other words, no regular sequence can be recognized in the distribution of the types of damper elements. However, the damper elements are again evenly spaced apart from each other.

This particular arrangement addresses the specific stresses associated with, for example, a dissymmetric structure of the nacelle 10.

Figure 6:
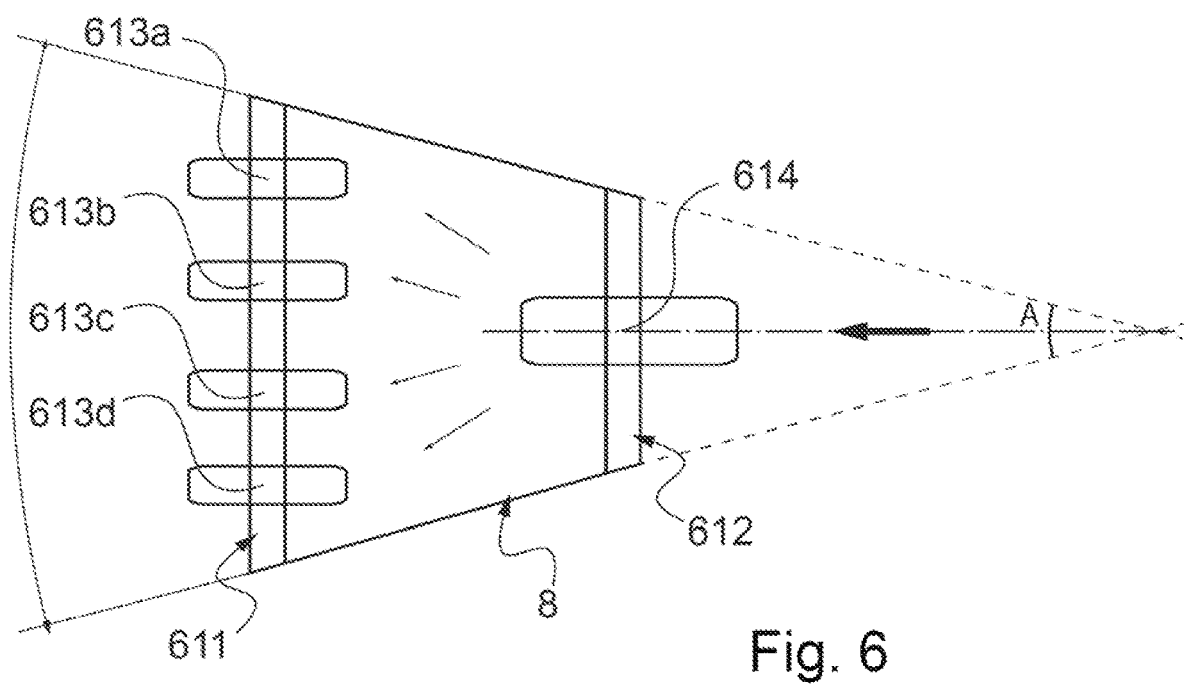
FIG. 6 shows a diagram of the distribution of forces in a damper element according to one embodiment of the invention.

As shown in FIGS. 5 and 6, in a particular embodiment, the perforations for fastening the damper element 8 and the sealing flange 610 can be suitably arranged to distribute the forces originating from the engine flange 7.

More specifically, the perforations 613 on the first branch 611 of the sealing flange 610 can be substantially in the same plane as the perforations 614 on the second branch 612 of the junction flange 610, or in different planes, so as to initiate a controlled deformation of the damper element 8, on the desired side.

As shown in FIG. 6, the second branch 612 of the sealing flange 610 comprises, for example, a perforation 614 for a plurality of perforations (namely four perforations in this case) 613a, 613b, 613c, 613d on the first branch 611 of the sealing flange 610. This distribution of the perforations (and therefore ultimately of the connections) allows better distribution of the forces. Obviously, the number of connections can be adapted to each considered configuration, for example, one connection or two connections, on the one hand, for one, two, three, four, five, six or eight, on the other hand.

Advantageously, the sum of the diameters of the perforations 613a, 613b, 613c, 613d arranged in the thickness of the first branch 611 is greater than the single diameter of the perforation 614 arranged in the thickness of the second branch 612.

Thus, the insertion force received and retained by the connection formed, for example, by a screw and nut assembly 92 on the side of the engine flange 7 is distributed at the output on the connections formed, for example, by screw and nut systems 91 on the side of the stiffening frame 5.

Furthermore, in order to facilitate a controlled initiation of deformation, the fastenings respectively located on the side of the engine flange 7, and those located on the side of the stiffening frame 5, optionally can be radially offset, i.e. at different distances from the main axis of the nacelle.

However, no perforation 613a, 613b, 613c, 613d (and correspondingly no connection) defined in the thickness of the first branch 611 is opposite the matching perforation 614 (and therefore the connection) defined in the thickness of the second branch 612.

This specific arrangement allows the distribution of the forces in the damper element 8 to be optimized.

Thus, the four perforations 613a, 613b, 613c, 613d, and the matching perforations of the damper element 8, are evenly spaced apart and are arranged symmetrically relative to the axis of the perforation 614 and of the matching perforation of the damper element.

Alternatively, a screw (or a plurality of screws) passing through the junction flange 6 can allow the connections to be formed for said junction flange 6 with the stiffening frame 5, on the one hand, and with the engine flange 7, on the other hand.

As shown in FIG. 6, the damper element 8, viewed from above (perpendicular to the section view of FIG. 4, and towards the main axis of the nacelle), can assume a substantially isosceles trapezium shape, the angle A of which that is formed between the sides thereof determines the distribution, in the damper element, of the forces originating from the engine flange 7 towards the stiffening frame 5. In particular, the four (for example) perforations 613a, 613b, 613c, 613d in the thickness of the first branch 611 and in the first side 81 of the matching damper element 8 can be located in an aperture angle of approximately 45° formed from a perforation 614 located in the thickness of the second branch 612 of the sealing flange 610 and the second side 82 of the matching damper element 8.

An embodiment of the invention that is thus developed provides an optimized connection between the front section P1 and the main section P2 of a nacelle of an aircraft propulsion assembly, particularly allowing very high mechanical forces to be absorbed, whilst protecting the connection between the front section P1 and the main section P2 against a risk of breakage. The connection developed in the invention is particularly adapted to a propulsion unit having a large nacelle, for example, a propulsion unit of the type with a high bypass ratio.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle of an aircraft propulsion assembly, comprising:
   a front section and a main section, said front section having a front end forming an air intake in the nacelle and a rear end comprising an annular stiffening frame around a rotary axis, said stiffening frame comprising an outer peripheral edge, connected to an outer panel of the nacelle, and an inner peripheral edge, said front section further comprising a connection part connecting said inner peripheral edge of the stiffening frame to an inner structure of the nacelle and a junction flange connected, via a plurality of connections, to said inner peripheral edge of the stiffening frame and to an engine flange of the main section,
   wherein the junction flange comprises a plurality of deformable damper elements distributed along said inner peripheral edge of the stiffening frame.

2. The nacelle according to claim 1, wherein at least one of the plurality of connections between the junction flange and the stiffening frame and between the junction flange and the engine flange comprises a spacer adapted to deform under the effect of mechanical stresses between said engine flange and said stiffening frame.

3. The nacelle according to claim 1, wherein each damper element is formed by a bridge of material having a hollow closed section.

4. The nacelle according to claim 3, wherein said hollow closed section forms a cavity, into which an elastomer element is inserted.

5. The nacelle according to claim 4, wherein said elastomer element comprises at least one recess of material.

6. The nacelle according to claim 4, wherein said elastomer element extends between at least two surfaces of said damper element.

7. The nacelle according to claim 1, wherein at least one damper element comprises a bridge of material and an elastomer element, said bridge of material comprises a hollow open section and said elastomer element lines inner walls of said damper element.

8. The nacelle according to claim 1, wherein at least one damper element comprises an armature and an elastomer element, said armature comprising a substantially S-shaped section, wherein said armature is fully or partly included in said elastomer element.

9. The nacelle according to claim 1, wherein each damper element has a section of substantially oval or circular shape.

10. The nacelle according to claim 1, comprising common connections between the stiffening frame, the connection part and the damper elements of the junction flange.

11. The nacelle according to claim 1, wherein the plurality of connections between the stiffening frame and the junction flange and between the junction flange and the engine flange each comprise at least one screw and nut assembly, and wherein each damper element of the junction flange comprises a first side and a second side that respectively comprise supports adapted to receive and retain the nuts of said screw and nut assemblies.

12. The nacelle according to claim 1, wherein said junction flange comprises a sealing flange formed by a ring having a substantially U-shaped section, and wherein one branch of the U shaped section is connected to said stiffening frame and the other branch of the U shaped section is connected to said engine flange.

13. The nacelle according to claim 12, wherein the sealing flange, the damper element and the stiffening frame, on the one hand, and the sealing flange, the damper element and the engine flange, on the other hand, are connected together by common connections.

14. The nacelle according to claim 1, wherein the plurality of connections between the stiffening frame and the junction flange, on the one hand, and between the junction flange and the engine flange, on the other hand, are circumferentially offset from each other so as not to be facing each other.

15. An aircraft propulsion assembly comprising a nacelle, said nacelle being the nacelle according to claim 1.

* * * * *